(12) United States Patent
Turner

(10) Patent No.: US 11,203,322 B2
(45) Date of Patent: Dec. 21, 2021

(54) VEHICLE CONTROL SYSTEM WITH WIRELESSLY-COUPLED UNDERHOOD COMPONENTS

(71) Applicant: DIRECTED, LLC, Vista, CA (US)

(72) Inventor: James S. Turner, Mesa, AZ (US)

(73) Assignee: VOXX INTERNATIONAL CORPORATION, Hauppauge, NY (US)

(*) Notice: Subject to any disclaimer, the term of this patent is extended or adjusted under 35 U.S.C. 154(b) by 0 days.

(21) Appl. No.: 16/783,039

(22) Filed: Feb. 5, 2020

(65) Prior Publication Data

US 2020/0247360 A1 Aug. 6, 2020

Related U.S. Application Data

(63) Continuation of application No. 16/243,073, filed on Jan. 8, 2019, now Pat. No. 10,589,715.

(60) Provisional application No. 62/614,939, filed on Jan. 8, 2018.

(51) Int. Cl.
*B60R 25/104* (2013.01)
*B60R 25/40* (2013.01)
*F02N 11/08* (2006.01)
*H04W 4/80* (2018.01)
(Continued)

(52) U.S. Cl.
CPC .......... *B60R 25/104* (2013.01); *B60R 25/102* (2013.01); *B60R 25/403* (2013.01); *F02N 11/0818* (2013.01); *H04W 4/80* (2018.02); *B60R 2025/1013* (2013.01)

(58) Field of Classification Search
CPC .......... B60R 2025/1013; B60R 25/102; B60R 25/104; B60R 25/403; F02N 11/0807; F02N 11/0818; F02N 11/0848; F02N 2200/022; H04W 4/38; H04W 4/48; H04W 4/80
See application file for complete search history.

(56) References Cited

U.S. PATENT DOCUMENTS

2002/0154036 A1* 10/2002 Flick ................... B60R 25/04
340/988
2005/0128068 A1* 6/2005 Winick ................ B60R 25/102
340/517

(Continued)

*Primary Examiner* — Omer S Khan
(74) *Attorney, Agent, or Firm* — Anatoly S. Weiser, Esq.; IPLCounsel.com

(57) ABSTRACT

A vehicle control system (VCS) in a passenger compartment interfaces with underhood components using a Bluetooth® link. The underhood components include a siren assembly with a sound generator and backup battery. The battery enables the siren assembly to function after the vehicle's battery is disabled. The siren assembly includes a Bluetooth® transceiver for establishing the link with the VCS. The siren assembly monitors the hood of the vehicle through a hood sensor, to detect unauthorized opening. In response to such opening, the siren assembly transmits an alarm to the VCS, which transmits an alarm to a user's mobile device and/or a security service. The sound generator may also be activated, by itself or under control of the VCS. The siren assembly connects to the engine computer/ignition module, to allow the VCS to monitor engine speed, and facilitate proper start of the engine when the VCS receives a remote start command.

17 Claims, 1 Drawing Sheet

(51) Int. Cl.
 *B60R 25/102* (2013.01)
 *B60R 25/10* (2013.01)

(56) References Cited

U.S. PATENT DOCUMENTS

| | | | |
|---|---|---|---|
| 2010/0211770 A1* | 8/2010 | Alrabady | H04L 9/0894 |
| | | | 713/150 |
| 2017/0092030 A1* | 3/2017 | Badger, II | G07C 9/00571 |
| 2017/0213459 A1* | 7/2017 | Ogaz | G08G 1/166 |
| 2018/0131083 A1* | 5/2018 | Barrios | H01Q 1/1271 |
| 2019/0010910 A1* | 1/2019 | Arnot | B60W 10/06 |

* cited by examiner

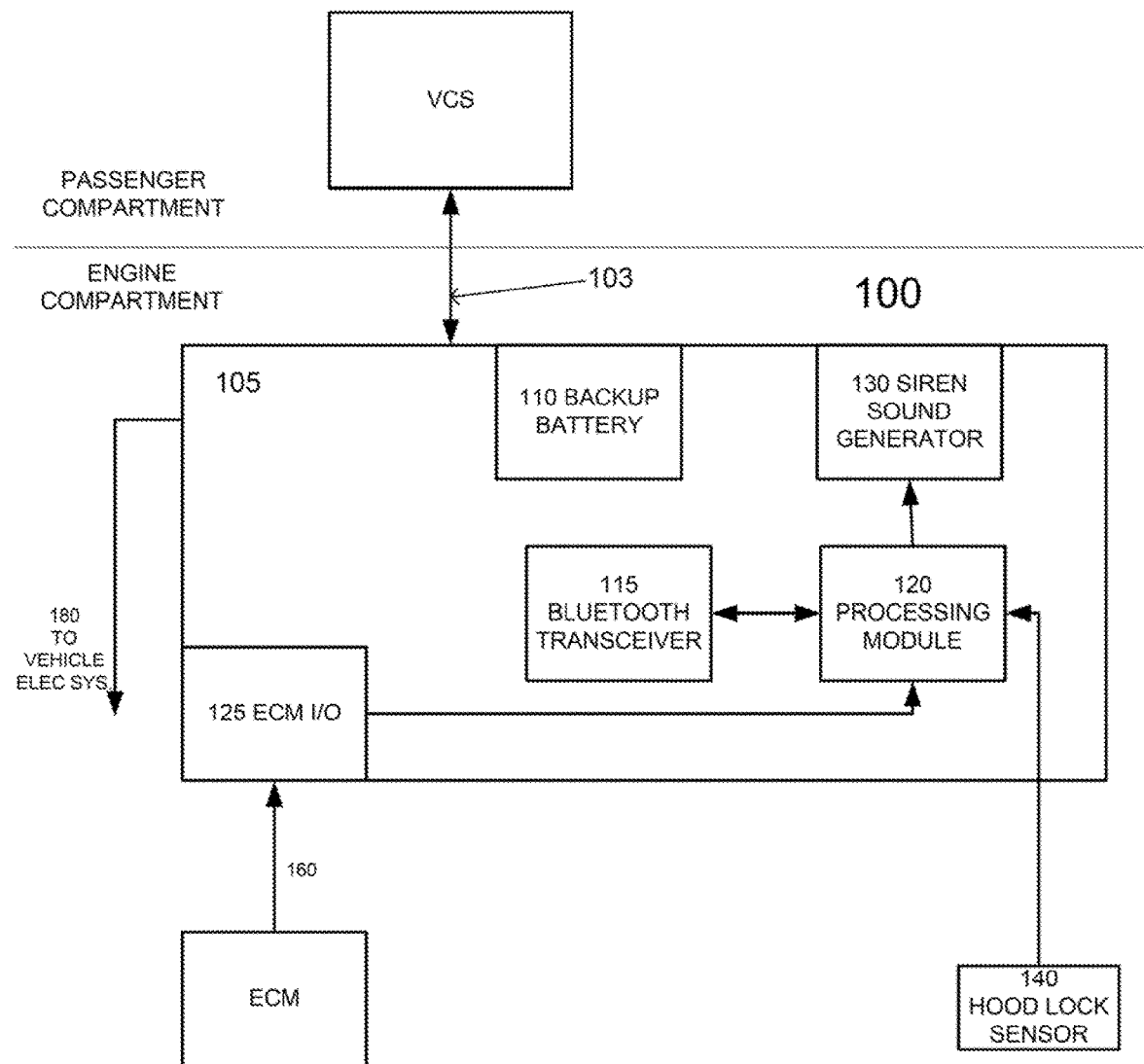

VEHICLE CONTROL SYSTEM WITH WIRELESSLY-COUPLED UNDERHOOD COMPONENTS

CROSS-REFERENCE TO RELATED APPLICATION

This application is a continuation of and claims priority to U.S. patent application Ser. No. 16/243,073, entitled VEHICLE CONTROL SYSTEM WITH WIRELESSLY-COUPLED UNDERHOOD COMPONENTS, filed Jan. 8, 2019, now allowed; which claims priority to U.S. Provisional Patent Application Ser. No. 62/614,939, entitled VEHICLE CONTROL SYSTEM WITH UNDERHOOD COMPONENTS, filed Jan. 8, 2018. Each of the above-referenced patent documents is hereby incorporated by reference in its entirety as if fully set forth herein, including text, figures, claims, tables, and computer program listing appendices (if present), and all other matter therein.

FIELD OF THE DISCLOSURE

This disclosure relates generally to the field of vehicular/automotive security, convenience, monitoring, and control products, both aftermarket and original equipment 20 manufacturer (OEM).

BACKGROUND

A vehicle control system (VCS) typically is an electronic system installed in vehicle for the user's convenience. A VCS can be an aftermarket or an OEM system. The functionality provided by such systems may include remote start capability, control of security and convenience features, climate control, and others.

A need in the art exists for improved techniques for controlling security and convenience features of vehicles equipped with such systems. A need in the art exists for facilitating field installation of such systems. A need in the art exists for improved resistance of such systems to tampering malicious, and particularly for improved ability of such systems to signal alarms when tampering occurs. A need in the art exists for improved reliability of such systems.

SUMMARY

This document describes embodiments, variants, and examples implementing novel techniques for addressing one or more of the needs identified above, and/or other needs.

In an embodiment, an aftermarket vehicle siren for installation under hood of a vehicle includes: a sound generator; a backup battery configured to power the siren when battery of the vehicle fails or is disabled; a Bluetooth® transceiver configured to establish a Bluetooth® communication link with a vehicle control system (VCS) installed in the passenger compartment of the vehicle; an interface to engine computer of the vehicle, configured to enable the siren to determine rpm of the engine of the vehicle and to communicate the rpm to the VCS, so that the VCS is enabled to shut ignition of the engine off in response to the rpm exceeding a predetermined rpm limit and to repeat remote start operation in response to the engine not starting; and a connection to the hood sensor in the vehicle, to enable the siren to determine when the hood of the vehicle is opened, and in response to the hood being opened to activate the sound generator and to transmit an alarm signal to the VCS.

In an embodiment, a siren assembly for installation under hood of a vehicle includes: a sound generator; a backup battery configured to power the siren assembly when battery of the vehicle fails to provide power to the siren assembly; a short range radio frequency (RF) transceiver configured to establish an RF communication link with a vehicle control system (VCS) installed in a passenger compartment of the vehicle; an interface to an engine computer of the vehicle, the interface being configured to enable the siren assembly to determine rotational speed of an engine of the vehicle; and a connection to hood open-closed sensor of the vehicle, to enable the siren assembly to determine when the hood of the vehicle is opened.

The Bluetooth® interface allows installation of the system and/or the VCS without running wires from the engine compartment to the passenger compartment. Various other features and aspects will be better understood with reference to the following description, drawings, and appended claim(s).

BRIEF DESCRIPTION OF THE FIGURES

FIG. 1 illustrates selected components of underhood apparatus for installation in a vehicle and functioning in conjunction with a vehicle control system or as part of the vehicle control system.

DETAILED DESCRIPTION

The words "embodiment," "variant." "example," and similar words and expressions as used in this document refer to a particular apparatus, process, or article of manufacture, and not necessarily to the same apparatus, process, or article of manufacture. Thus, "one embodiment" (or a similar word/expression) used in one place or context may refer to a particular apparatus, process, or article of manufacture; the same or a similar expression in a different place or context may refer to a different apparatus, process, or article of manufacture. The expression "alternative embodiment" and similar words and phrases are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is a preferred one; the embodiment, variant, or example may but need not be a currently preferred embodiment, variant, or example. All embodiments, variants, and examples are described for illustration purposes and are not necessarily strictly limiting.

The words "couple," "connect." and similar words/expressions with their inflectional morphemes, as well as similar words and phrases, do not necessarily import an immediate or direct connection, but include within their meaning connections through mediate elements, as well as direct connections.

The expression "processing logic" should be understood as selected steps/decision blocks and/or hardware/software/firmware for implementing the selected steps/decision blocks. "Decision block" means a step in which a decision is made based on some condition, and subsequent process flow is selected based on whether the condition is met or not.

Some definitions have been explicitly provided above. Other and further explicit and implicit definitions and clarifications of definitions may be found throughout this document.

FIGURE 1 illustrates selected components of underhood apparatus 100 for installation in a vehicle and functioning in conjunction with (e.g., as part of) a vehicle control system, such as (or similar to or having selected components of) the vehicle control systems described in a now allowed commonly-owned U.S. patent application entitled REMOTE VEHICLE SYSTEM CONFIGURATION, CONTROL, AND TELEMATICS, James S. Turner first-named inventor, Ser. No. 15/862,630, filed on or about Jan. 4, 2018, which is incorporated herein by reference for all purposes, including specification, abstract, figures, and claims. U.S. patent application Ser. No. 15/862,630 may be referred to as the "incorporated application."

The apparatus 100 includes a siren assembly 105, a hood open-close sensor 140, a wired connection 160 to the engine control module (ECM) or ignition module of the vehicle, and a vehicle battery connection 180.

In normal operation, the siren assembly 105 is powered by the electrical power provided by the vehicle battery through the vehicle battery connection 180. The vehicle battery may be any battery of the vehicle, such as a battery that powers the starter of a combustion engine of the vehicle, and a battery that powers electric motor(s) of the vehicle's power train in hybrid and electric vehicles. In case of a failure of the vehicle battery and/or the connection 180, the siren assembly 105 is powered by its backup battery 110. The battery 110 may be a primary battery. It can also be a rechargeable battery, such as a Lithium Ion (Li-Ion), Lithium-Polymer (LiPo), Nickle Cadmium (NiCad). Nickle Metal Hydride (NiMH), and lithium titanate battery. The use of the word "battery" here means simply one or more cells; the battery 110 may (but need not) have multiple cells. Although no connections are shown from the battery 110 to the other components that use electric power, such connections would typically be present.

The siren assembly 105 also includes a radio frequency (RF) transceiver 115. The transceiver 115 may be a Bluetooth® transceiver capable of pairing with various Bluetooth®-enabled devices and sending/receiving data to/from such Bluetooth®-enabled devices; the Bluetooth® transceiver 115 may communicate and have active Bluetooth® links with two or more Bluetooth®-enabled. Here, the Bluetooth® transceiver 115 connects the siren assembly 105 to the VCS or part of the VCS installed in the passenger compartment of the vehicle. Note, however, that although this description generally refers to Bluetooth® devices, other relatively-short range RF technologies may be used instead or in addition to Bluetooth®. Relatively-short range may be understood as communication range comparable to Bluetooth® communication range and radiated power of the order of Bluetooth® power, for example, no more than two times maximum Bluetooth® power; in examples, the radiated power is no more than 1.5 times maximum Bluetooth® Low Energy radiated power.

The siren assembly 105 additionally includes a processing module 120, which includes a processor with supporting circuitry, such as memories including a non-volatile memory storing the machine instructions executed by the processor and configuration information. The configuration information may include the Bluetooth® pairing data for the VCS. In embodiments, however, the processing module 120 includes a special purpose or dedicated processing circuitry, such as application-specific integrated circuitry for processing. The processing module 120 may execute program code to cause the siren assembly 105 to be configured as is described throughout this document, and to operate the other components of the siren assembly 105 to cause these components to perform as is described throughout this document.

The siren assembly 105 further includes an interface 125 to the engine computer module or ignition module. The interface 125 allows the processing block 120 to read/determine the speed (rpm) of the engine of the vehicle.

The siren assembly 105 also includes a sound generator 130, that is, the siren proper. The sound generator 130 is controlled by the processing module 120, which can cause the sound generator 130 to emit various sounds, such as intruder alerts and short warning beeps.

The components of the siren assembly 105 may be contained in an enclosure, which enclosure may facilitate the installation of the siren assembly 105 in various underhood locations of different vehicles.

In a typical installation, the siren assembly 105 is installed under the hood of the vehicle, and coupled by the vehicle battery connection 180 to the vehicle's battery/electrical system, which provides electrical power tier the operation of the siren assembly 105. (The battery 110 may also receive charging power from the battery connection 180, fir example, in embodiments where the battery 110 is a rechargeable battery.) The hood sensor 140 may be installed on or near the hood lock and coupled by a wired connection to the siren assembly 105, so that the processing, module 120 can read the state of the hood lock. The hood sensor 140 may also or instead sense the state of the hood from another location, such as on the side/front of the engine compartment where the hood rests in normal operation of the vehicle. Further, the hood sensor may be installed near or be integrated with a strut that holds the hood in the open position. The hood open-close sensor 140 may be, for example, a simple contact pair that is read by the processing module 120 as a ground when the hood is closed, and as an open circuit when the hood is open (or vice versa). The wired connection of the hood sensor 140 may operate on an interrupt input of the processing module 120, so that the siren assembly 105 can react substantially immediately to an unauthorized opening of the hood of the vehicle (when the siren assembly 105 is in an armed state); for example, the siren assembly may sound an alarm through the sound generator 130 and also or instead signal the VCS (or a part of the VCS) installed in the passenger compartment of the vehicle, thorough the Bluetooth® transceiver 115. The VCS in the armed state can then transmit an alarm to an authorized user control and communication device (e.g., a smartphone, tablet, smart key, smartwatch) and/or to an alarm monitoring service. The VCS is in the armed state when such state is turned on by the user or automatically. The armed state of the VCS corresponds to activation of one or more security features intended/designed to prevent theft of and/or tampering with the vehicle. The VCS is configured to transmit through the RF communication link 103 to the siren assembly 105 an arming signal to arm the siren assembly in response to the VCS being armed. When the VCS is disarmed (by the user through the user control and communication device), the VCS transmits through the RF communication link 103 a disarming signal to the siren assembly 105. The siren assembly 105 enters an armed state in response to receipt of the arming signal from the VCS, and exits the armed state in response to receiving a disarming signal from the VCS. In the armed state, the siren assembly 105 may activate the sound generator 130 in response to sensing opening of the hood through the hood open-close sensor 140. When in the armed state, the siren assembly 105 may transmit to the VCS through the RF communication link 103 an alarm indication signal, in response to sensing opening of the hood through the hood open-close sensor 140, In operation, when the VCS receives a remote start command (from the user smartphone, smartwatch, tablet, or remote key, for example), the VCS activates the starter. The VCS then monitors the rotational speed of the engine (rpm) during the starter operation and thereafter, so that if the engine does not start on the first (or a subsequent) attempt, as determined from the engine speed, the VCS can repeat the remote start attempt, and possibly repeat it again, for a predetermined number of times. If the remote start results in the engine starting and reaching unsafe operating rpm, the VCS may decide to turn-off the ignition. For example, the normal rpm range may be set between 500 and 1500 rpm, with operation above 2500 rpm deemed unsafe and resulting in the VCS shutting off the ignition; rpm between 1500 and 2500 may be considered within a caution range, so that frequent monitoring and appropriate response by the VCS (such as shutting off the ignition) may be warranted if the rpm surges above the upper limit or the rpm caution range lasts longer than a predetermined period of time.

The features described throughout this document may be present individually, or in any combination or permutation, except where the presence or absence of specific features (elements/limitations) is inherently required, explicitly indicated, or otherwise made clear from the description. This applies whether or not features appear related to specific embodiments.

Although the process steps and decisions (if decision blocks are present) may be described serially in this document, certain steps and/or decisions may be performed by same and/or separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or to necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for vehicle control systems with under hood components connected to the main VCS by a short-range RF link, such as a Bluetooth® link. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A remote start method. comprising steps oft
   receiving a wireless remote start command by a vehicle control system (VCS) installed in a passenger compartment of a vehicle, wherein the wireless remote start command is sent by a mobile user device;
   activating a starter of the vehicle by the VCS in response to the VCS receiving the wireless remote start command, thereby attempting to start an engine of the vehicle:
   obtaining one or more readings of rotational speed of the engine by a. siren assembly installed in an engine compartment of the vehicle, the siren assembly being coupled to the VCS by a short range radio frequency (RF) communication link, wherein the siren assembly comprises a battery to power the siren assembly when battery of the vehicle fails or is disabled, and wherein the siren assembly is connected via a wired connection to the hood open-closed sensor of the vehicle;
   sensing by the siren assembly state of tite hood of open-closed sensor through the wired connection:
   receiving by the VCS from the siren assembly the state of the hood open-closed sensor of the vehicle, through the short range RP communication link;
   causing an alarm in response to the state of the hood open-closed sensor indicating that the hood of the vehicle is opened while the VCS is in an armed state for vehicle security monitoring;
   receiving the one or more readings of rotational speed of the engine by the VCS from the siren assembly through the short range RF communication link; and
   repeating the step of activating the starter if the engine does not start in response to the step of activating.

2. The remote start method as in claim 1, further comprising turning off ignition of the engine by the VCS in response to at least one of the one or more readings of rotational speed of the engine indicating that the rotational speed exceeds a predetermined Revolutions per Minute (RPM) limit.

3. The remote start method as in claim 1, wherein:
   the siren assembly comprises a sound generator; and
   the step of causing the alarm comprises activating the sound generator.

4. The remote start method as in claim 1, wherein the step of causing the alarm comprises transmitting an alarm indication from the VCS to a user control and communication device.

5. The remote start method as in claim 1, wherein the step of causing the alarm comprises transmitting an alarm indication from the VCS to a user control and communication device selected from the group consisting of a smartphone, a tablet, a smart key, and a smartwatch.

6. The remote start method as in claim I, wherein the step of causing the alarm comprises transmitting an alarm indication from the VCS to an alarm monitoring service.

7. The remote start method as in claim 1, wherein the short range RF communication link is a Bluotooth® link between the VCS and the siren assembly.

8. The remote start method as in claim 1, further comprising transmitting the wireless remote start command. by the mobile user device.

9. An apparatus, comprising:
a siren assembly installed in an engine compartment of a vehicle, the siren assempbly comprising a backup battery;
a vehicle control system (VCS) installed in a passenger s ompartment of the vehicle; and
a hood open-closed sensor of the vehicle and connected via a wired connection to the siren assembly to enable the siren assembly to read state of the hood open-closed sensor;
wherein the VCS is configured to:
receive a wireless remote start command from a user mobile device;
activate a starter of the vehicle in response to receiving the wireless remote start command, thereby attempting to start an engine of the vehicle;
receive one or more readings of rotational speed of the engine from the siren assembly installed it the engine compartment of the vehicle, through a short range RF communication link between the VCS and the siren assembly;
repeat the step of activating the starter in response to the engine not starting;
receive from the siren assembly through the short range RF communication state of the open-closed sensor of the vehicle; and
cause an alarm in response to the state of the hood open-closed sensor indicating that the hood of the vehicle is opened while the VCS is in an armed state for vehicle security monitoring.

10. The apparatus as in claim 9, wherein the VCS is further configured to turn off ignition of the engine in response to at least one of the one ter more readings of rotational speed of the engine indicating that the rotational speed exceeds a predetermined Revolutions per Minute (RPM) limit.

11. The apparatus as in claim 9, wherein the VCS is further configured to:
receive from the siren assembly through the short range RF communication link the state of the hood open-closed sensor of the vehicle; and
transmit an alarm indication to a user control and communication device in response to the state of the hood open-closed sensor indicating that the hood of the vehicle is opened while the VCS is in the armed state for vehicle security monitoring.

12. The apparatus as in claim 9, wherein the VCS is further configured to:
receive from the siren assembly through the short range RF communication link the state of the hood open-closed sensor of the vehicle; and
transmit an alarm indication to a user control and communication device in response to the state of the hood open-closed sensor indicating that the hood of the vehicle is opened while the VCS is in the armed state for vehicle security monitoring, the user control and communication device being selected from the group consisting of a smartphone, a tablet, a smart key, and a smartwatch.

13. The apparatus as in claim 9, wherein the VCS is further configured to;
receive from the siren assembly through the short range RF communication link the state of the hood open-closed sensor of the vehicle; and
transmit an alarm indication to an alarm monitoring service in response to the state of the hood open-closed sensor indicating that the hood of the vehicle is opened while the VCS is in the armed state for vehicle security monitoring.

14. The apparatus as its claim 9, wherein the VCS is further configured to transmit to the siren assembly a siren arming signal, wherein the siren assembly enters the armed state in response to the siren arming signal, the siren assembly being configred so that in the armed state the siren assembly sounds an alarm in response to the hood open-closed sensor indicating unauthorized opening of the hood of the vehicle.

15. The apparatus as in claim 14, wherein the VCS is further configured to transmit to the siren assembly a siren disarming signal, wherein the siren assembly exits the armed state in response to the disarming signal.

16. The apparatus as in claim 9, wherein the short range RF communication link is a Bluetooth® link between the VCS and the siren assembly.

17. The apparatus as in claim 9, wherein the VCS is not connected to the siren assembly by a wired connection.

* * * * *

UNITED STATES PATENT AND TRADEMARK OFFICE
CERTIFICATE OF CORRECTION

PATENT NO. : 11,203,322 B2
APPLICATION NO. : 16/783039
DATED : December 21, 2021
INVENTOR(S) : James S. Turner It is certified that error appears in the above-identified patent and that said Letters Patent is hereby corrected as shown below:

In the Claims

Column 6, Line 22, in Claim 1, cancel "A remote start method. comprising steps oft" and replace with --A remote start method, comprising steps of:--;

Column 6, Line 30, in Claim 1, cancel "vehicle:" and replace with --vehicle;--;

Column 6, Line 32, in Claim 1, cancel "engine by a. siren" and replace with --engine by a siren--;

Column 6, Line 40, in Claim 1, cancel "state of tite hood of" and replace with --state of the hood--;

Column 6, Line 41, in Claim 1, cancel "connection:" and replace with --connection;--;

Column 6, Line 44, in Claim 1, cancel "range RP communication" and replace with --range RF communication--;

Column 7, Line 6, in Claim 6, cancel "claim I, wherein" and replace with --claim 1, wherein--;

Column 7, Line 10, in Claim 7, cancel "Bluotooth" and replace with --Bluetooth--;

Column 7, Line 13, in Claim 8, cancel "command. by" and replace with --command by--;

Column 7, Line 17, in Claim 9, cancel "assempbly" and replace with --assembly--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*